United States Patent [19]
Kowalski et al.

[11] 3,859,007
[45] Jan. 7, 1975

[54] APPARATUS FOR MONITORING AND LIMITING THE SPEED OF TURBINES

[75] Inventors: Hans-Jochen Kowalski, Erlangen; Peter Schonfeld, Essen, both of Germany

[73] Assignee: Siemens Aktiengesellschaft, Munchen, Germany

[22] Filed: Nov. 1, 1973

[21] Appl. No.: 411,916

[30] Foreign Application Priority Data
Nov. 6, 1972 Germany............................ 2254250

[52] U.S. Cl..................................... 415/30, 60/660
[51] Int. Cl........................................... F01b 25/06
[58] Field of Search ................ 340/271; 415/30, 36; 60/660

[56] References Cited
UNITED STATES PATENTS
3,692,419 9/1972 Katagiri ............................... 415/30
3,798,907 3/1974 Barrett et al........................... 415/30

Primary Examiner—Martin P. Schwadron
Assistant Examiner—Allen M. Ostrager
Attorney, Agent, or Firm—Kenyon & Kenyon Reilly Carr & Chapin

[57] ABSTRACT

An improved apparatus for determining and monitoring the speed of rotation of a turbine through the use of three parallel electronic channels separated from each other and arranged so that only when two of the three channels indicate an excessive speed will the turbine be shut down. Also included are self test means for checking each of the three channels independently or together to ensure proper operation of all components therein.

16 Claims, 6 Drawing Figures

APPARATUS FOR MONITORING AND LIMITING THE SPEED OF TURBINES

BACKGROUND OF THE INVENTION

This invention relates to turbine control in general and more particularly an improved electronic apparatus for monitoring turbine speed.

Turbine over-speed monitoring has typically been done in the prior art through the use of a fast acting mechanical hydraulic shutoff arrangement which comprised essentially a spring-loaded slide valve coupled to a centrifugal-force pin. In this arrangement, when a given speed above the nominal speed was exceeded, the spring force was overcome and the slide valve used to shut off the steam supply to the turbine in a fast acting manner. With such a mechanical design adjustment to a high accuracy was not possible nor did the device have a self-test capability. This resulted in improper shut down due to poor adjustment on one hand and damaged turbines due to faulty devices on the other hand.

Thus, it can be seen that there is a need for an overspeed protection arrangement for use with steam turbines in which speed limits can be accurately adjusted over a large range and which apparatus is capable of self-testing to ensure its proper functioning.

SUMMARY OF THE INVENTION

The present invention provides such an apparatus through the use of three parallel monitoring channels each made up of a plurality of electronic modules. Three separate pulse transmitters are coupled to the turbine and provide input pulse trains at a frequency representative of turbine speed into the separate channels. These pulse trains are compared with predetermined values and when the predetermined value is exceeded, provide outputs to a fast acting shut-off valve. The use of three separate channels permits shutting down only when two channels are providing an output indication. This prevents shut-down due to malfunctioning in a single channel whille still providing the required safety. In addition, because of this feature, each monitoring channel can be separately checked by self test circuits built into the channel to assure that all its components are properly functioning without shutting down the turbine. Various types of self-checking are possible permitting isolation of faulty portions of the system with comparative ease.

Although the present system discloses a two out of three selection, using three channels, greater number of channels are possible. This of course, adds to the expense and as will be evident from the discussion below, two out of three would appear to be an optimum number.

The present invention uses the closed circuit principle in shutting off the supply to the turbine by means of deenergizing coils of electro hydraulic control elements. Means are also disclosed for conducting a complete test of two channels at a timer termed a "test in earnest" in which an auxillary supply for controlling the shut-off valve is used to maintain turbine operation during testing.

DETAILED DESCRIPTION OF THE PREFERRED EMBODIMENT

Figures 1, 1A:
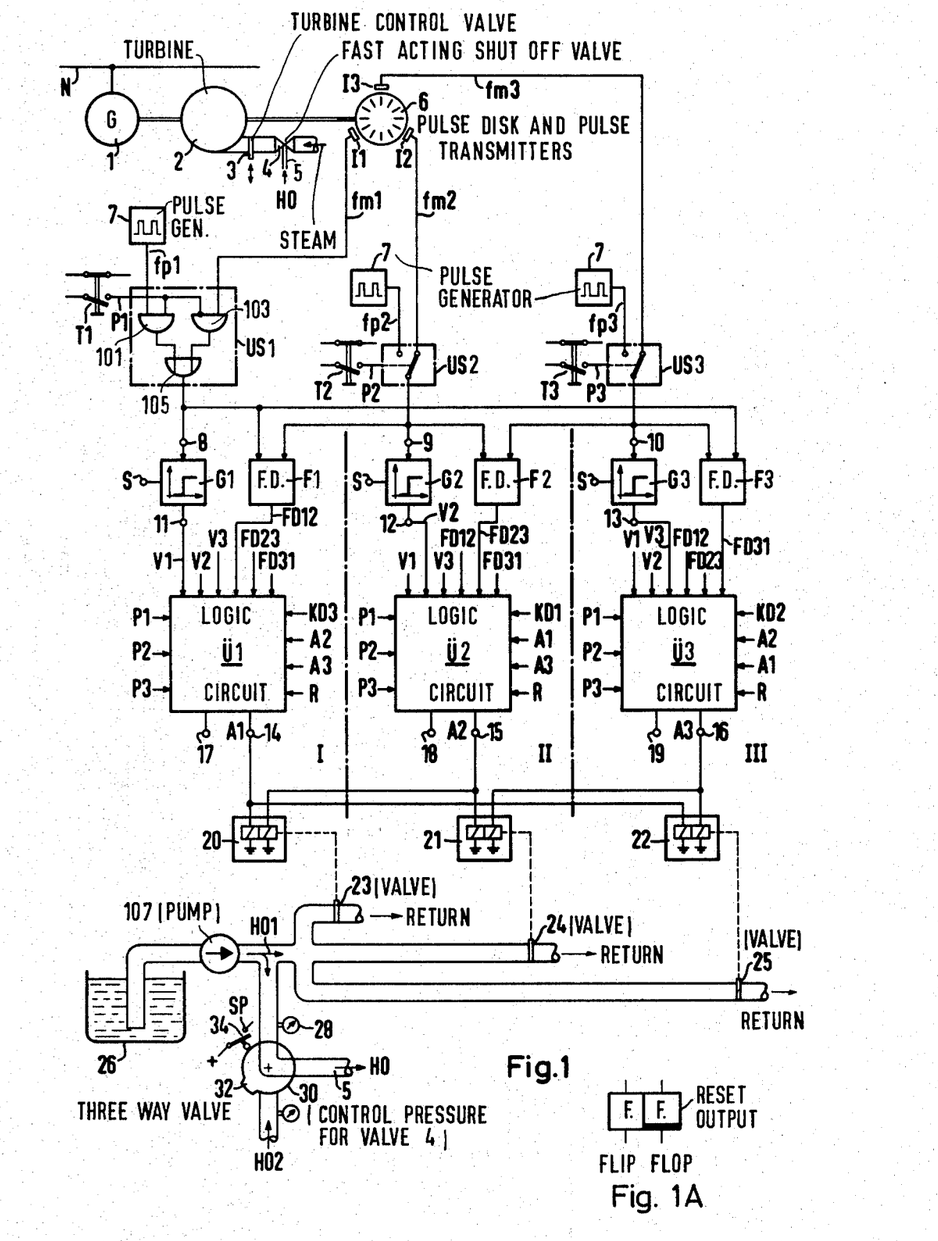
FIG. 1 is a system block-schematic diagram illustrating the system of the present invention.
FIG. 1a is a diagram illustrating the logic symbols used in FIGS. 1, 3 and 4.

As shown in FIG. 1, a steam turbine 2 is coupled to a generator 1 which supplies output power to a line N. Steam is supplied to the turbine through a fast acting shut-off valve 4 and a conventional control valve 3. During normal operation the fast acting shut-off valve 4 will be fully open and control of turbine speed and output maintained through the use of valve 3. However, should the turbine overspeed it is necessary that this condition be sensed and the valve 4 be immediately closed off to shut-down the turbine as quickly as possible. As noted above, the system of the present invention provides this shut-down function.

Coupled to the shaft of a turbine is a pulse disk 6 around which are arranged three pulse transmitters designated I1, I2 and I3. These stationary pulse generators may comprise for example Hall effect generators and will furnish pulse trains outputs designated as $f_{m1}$, $f_{m2}$ and $f_{m3}$ respectively.

The pulse trains are provided respectively to three switches designated US 1, US 2 and US 3 one being associated with each of the three channels I, II and III to be described below. Preferably, these switches will comprise electronic switches as shown in the block US 1 associated with the channel designated by I. These switches permit switching between the normal pulse output from a respective transmitter and a pulse train used for testing purposes and provided by respective pulse generators 7 into each of the switches. In addition to having separate pulse generators, each channel will have a separate power supply in keeping with the system philosophy of independent channels so that a malfunction of an element in one channel will not shut down the turbine. Thus, as illustrated by the schematic representation in the blocks US 2 and US 3 associated with channels II and III, the switch may be coupled to either the normal pulse train from its associated transmitter or to the output of a pulse generator 7.

The preferred electronic switch arrangement shown in the block US1 associated with channel I comprises three gates. FIG. 1A illustrates the symbols used for various type gates. Thus, a gate having its input only extending to the edge is an AND gate. A gate wherein the inputs extend into the gate is an OR gate. With either type gate, a dot at one of the inputs indicates that that input is inverted. Also shown on FIG. 1A is a flip-flop shown as a divided block with a darkened portion at the output which represents the rest or $\overline{Q}$ output. The logic of the present invention will be discussed in terms of 1 and 0. A "1" indicates the presence of a signal or a voltage and a "0" the absence thereof. As is well known, an AND gate will have a 1 output if both inputs are 1. An OR gate will have a 1 output if either input is 1. An AND gate with an inverted input will have a 1 output if its non-inverted input is a 1 and its inverted input is an 0. Similarly, an OR gate with an inverted input will have an output if its non-inverted input is 1 or its inverted input is 0. Another type of gate illustrated on FIG. 1A is a NOR gate. This is essentially an OR gate with an inverted output as indicated by the dot at the output of the gate. A NOR gate will have a 1 output only if both its inputs are 0.

Returning now to the logic circuit in the blocks US1 associated with channel I, it will be seen that the circuit comprises an AND gate 101, and AND gate 103 having an inverted input and an OR gate 105. In the position shown with the switch T1 open, the line P1 will have an 0 thereon which when inverted will appear as a 1 at the inverted input of AND gate 103. This enables AND gate 103 to pass the pulses on line $f_{ml}$, i.e. whenever a pulse on line $f_{ml}$ goes to a 1 state, a 1 output will result from gate 103. A 1 at the output of gate 103 will thus, appear as a 1 at the output of OR gate 105. With the switch in the position not shown, a 1 will be placed on the line P1. This 1 when inverted at gate 103 will become a 0 disabling that gate. The 1 at gate 101 will enable that gate to permit pulses from the pulse generator 107 to be provided at the output of gate 101 and thus through OR gate 105 to the terminal designated 8. Thus, in each of the switches US1, US 2 and US 3 with the switch T1, T2 or T3 in the position shown the pulses from the respective pulse generators I1, I2 and I3 will be provided to the respective terminals 8, 9 and 10. For any switch which is in the opposite position, the pulse output of the pulse generator 7 will instead be provided to the terminals 8, 9 and 10. The pulse generators 7 are used to generate a pulse train at a frequency which is higher than the predetermined maximum turbine output frequency and thus may be used in overspeed tests as will be described in more detail below.

Terminals 8, 9 and 10 are the inputs to respective limit detectors or frequency comparators designated respectively as G1, G2 and G3. The outputs of these are one of the primary inputs for each of the channels. As will be explained in more detail below, the limit detectors G1, G2 and G3 compare the output from the switches US1, US2 and US3 respectively with a predetermined frequency and provide a 0 output at their terminals 11, 12 and 13 respectively if the input frequency is less than the predetermined frequency and a 1 output at those terminals if the input frequency is greater than the predetermined frequency. Input S permits preselecting different limiting frequencies and thus limiting turbine speeds. The outputs of the respective switches are also provided into frequency detectors designated F1, F2 and F3 associated with each of three channels. The frequency detector F1 for channel II has as inputs the outputs of switches US1 and US 2. The frequency comparator F2 has as inputs the outputs of switches US 2 and US 3. The frequency comparator F3 has as inputs the outputs of switches US 1 and US 2. Each of the respective frequency comparators F1 through F3 will provide a 0 output if the two frequency inputs are the same and a 1 output if the 2 input frequencies are different. The frequency detectors F1, F2 and F3 are used primarily in malfunction detection as will be described in more detail below.

The output of the comparators G1, G2 and G3 and which are designated respectively V1, V2 and V3 are the primary signals used for shutting down the turbine. These signals are provided into the blocks Ü1, Ü2 and Ü3 which will be described in greater detail below. In response to an output V1, V2 or V3 and the occurrence of other necessary conditions respective outputs appear at the terminals A1, A2 and A3. If an actual overspeed condition has occurred, all of the three signals V1, V2 and V3 will be present at the input to the blocks Ü1, Ü2 and Ü3. And, if the system is operating properly, all of the outputs A1, A2 and A3 will be present. In this regard, it should be explained that when speaking of an output at A1, A2 and A3 what is being referred to is an indication that an overspeed condition has occurred. In actuality, a voltage is provided at these outputs at the terminals 14, 15 and 16 respectively during normal operation and that voltage removed when overspeeding occurs. The outputs A1, A2 and A3 are brought in pairs to relays 20, 21 and 22. Each relay will remain energized as long as one of the inputs is at the proper voltage. That is, both inputs to one of these relays must be 0 before the relay will drop out. As shown, relay 20 has as inputs the outputs A1 and A2, relay 21 the outputs A2 and A3 and relay 22 the outputs A1 and A3. If an overspeed occurs and all equipment is operating properly all of the output signals A1, A2 and A3 will go to 0 and all three relays 20, 21 and 22 will drop out. However, should a malfunction cause an inadvertant output in only one of the channels, no relay will drop out since each relay will still have a voltage input to one of its coils. This prevents tripping of the turbine in the case of a malfunction in one channel. Similarly, if a malfunction occurs in one channel which prevents an overspeed output from causing a respective channel output to go to 0 the two remaining channels will operate one of the relays.

The output of relays 20, 21 and 22 are connected to respective slide valves 23, 24 and 25. Normally, with the relays held energized these valves are maintained in a closed position. A reservoir 26 of hydraulic fluid is provided at the input to a pump 107 which pumps this hydraulic fluid into a line 5 wherein the pressure is designated as H0. Also coupled to the line 5 are three lines containing the three valves 23, 24 and 25. These lines are returns to the reservoir 26. In normal operation with the three valves 23, 24 and 25 closed, the pump 107 provides a pressure H01 over line 5 to the fast-acting valve 4 to maintian it in a open position. However, should any of the valves 23, 24 or 25 be open, the pressure is immediately reduced causing the valve 4 to close and shut down the turbine.

Thus, reviewing the operation of the system the transmitters I1 through I3 sense the speed of the turbine and provide output pulses through their respective switches to the channels I, II and III where, in the comparators G1, G2 and G3, this frequency is compared with a predetermined frequency which should not be exceeded. If this frequency is exceeded, outputs V1, V2 and V3 occur which cause outputs at terminals A1, A2 and A3 to go to 0 causing the relays 20, 21 and 22 to drop out releasing the pressure H0 which is applied to the fast-acting valve 4 to shut down the turbine.

Each of the blocks Ü1, Ü2 and Ü3 have associated therewith a plurality of inputs other than their respective comparator outputs. Thus, each has as inputs the comparator outputs from the other two comparators, the outputs FD12, FD23 and FD31 from each of the three frequency detectors and, the inputs P1, P2 and P3. Also provided as inputs are the respective outputs A1, A2 and A3 of the other two channels, an input designated KD1, KD2 or KD3 and an input designated R. These additional inputs, with the exception of the input R are used in logic circuits in the blocks U1, U2 and U3 to detect malfunctions in a manner which will be described below and also for test purposes. The input R is an input obtained from the turbine which indicates that the valve 3 is open and that steam is being supplied to the turbine blades. Otherwise, the turbine is not operating and any outputs have no meaning. As will be seen below, the input R is an enabling input for the signals V1, V2 and V3 and is necessary for them to result in outputs A1, A2 and A3 indicating an overspeed condition.

Essentially, two modes of testing are possible. One of these is the single channel test and the other is designated the "test in earnest" wherein two channels at a time are tested in order to obtain a complete output opening one of the valves 23, 24 and 25. The exact manner in which these tests operate will be seen more clearly in connection with FIG. 4. Briefly, however, the single channel test is conducted by closing one of the switches T1, T2 or T3. This results in the high input frequency from the frequency generator 7 being provided to one of the respective inputs terminals 8, 9 or 10 as described above. This high input frequency in turn causes the respective frequency comparator G1, G2 or G3 to provide a respective output V1, V2 or V3. This in turn will result in one of the outputs A1, A2 or A3 going to 0. Indicating means are provided to verify that this occurs. Note, however, that since only one channel is being tested and only one 0 output occurs, none of the valves 23, 24 or 25 will open. This test will also cause two of the frequency detectors F1, F2 and F3 to have an output which are used in the blocks U1, U2 and U3 in a manner to be described below to ensure that the complete system is operating properly.

Conducting a complete test or test in earnest on two channels will of course cause one of the relays 20, 21 or 22 to drop out opening its respective valve. If no further measures were taken this would result in the turbine being shut-down. To provide for such testing, a second hydraulic line having a pressure H0 2 is provided as a second input to a valve 30. This valve is designed so that either the pressure H01 or the pressure H02 may be coupled to the output line 5 supplying pressure to the valve 4. Thus, when the test in earnest is to be made, the valve 30 is operated to couple line 5 with the pressure HO2. The valve has located on it a cam 32 which operates a limit switch 34 having a positive voltage on its input. In response to movement of the valve it provides an output designated at SP indicating that it is safe to make a test in earnest. Value 30 can be a three way slide valve of conventional design designed so that rotation of 90° will switch the supply from H01 to H02. Also shown in the piping is a pressure gauge or manometer 28 to permit measurement of the pressure HO1. Thus, during the test in earnest when one of the values 23, 24 or 25 are open the pressure at manometer 28 may be observed to ensure that a pressure drop occurs.

Figure 2:
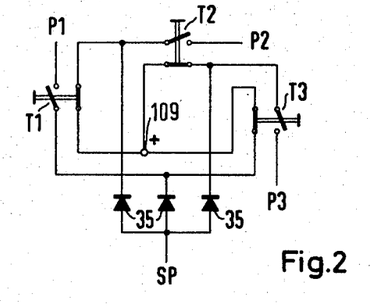
FIG. 2 is a circuit diagram illustrating the interlock arrangement which prevents testing more than one channel at a time unless the hydraulic actuators are supplied by a separate source.

The switches T1, T2 and T3 used for initiating both types of tests are interlocked as shown on FIG. 2 to insure that only single channel tests can be performed unless the value 30 has been rotated and the signal SP is present. Each of the three switches P1, P2 and P3 has two sets of contacts, one of which is normally open and the other of which is normally closed. When the switch is operated to start a test the normally open set of contacts are closed and the normally closed set of contacts open. A positive voltage is provided at a terminal 109. Consider first the case where the signal SP is not present i.e. there is no voltage at the anodes of diode 35. Voltage to the normally open contacts of switch T1 is provided through the normally closed contacts of switch T3. Similarly, the voltage to the normally open contacts of switch T2 is provided through the normally closed contacts of T1 and the voltage to the normally open contacts of T3 through the normally closed contacts of T2. This arrangement insures that in the absence of a voltage SP, only one of the outputs P1 through P3 can be present. For example, consider the case where T1 is depressed. A voltage appears on the output P1. If T2 is then pressed no voltage will appear on the output P2 since the normally closed contact of T1 is now open. If T3 is depressed, a voltage will appear on the output P3 but the voltage on the output P1 will be removed by the opening of the normally closed contact of P3. Thus, only one output signal can be present at one time even if two or more of the switches are depressed. However, if the voltage SP is present, each switch is fed individually through their respective diodes and simultaneous outputs on two or more of the lines P1, P2 and P3 are possible.

Figure 3:
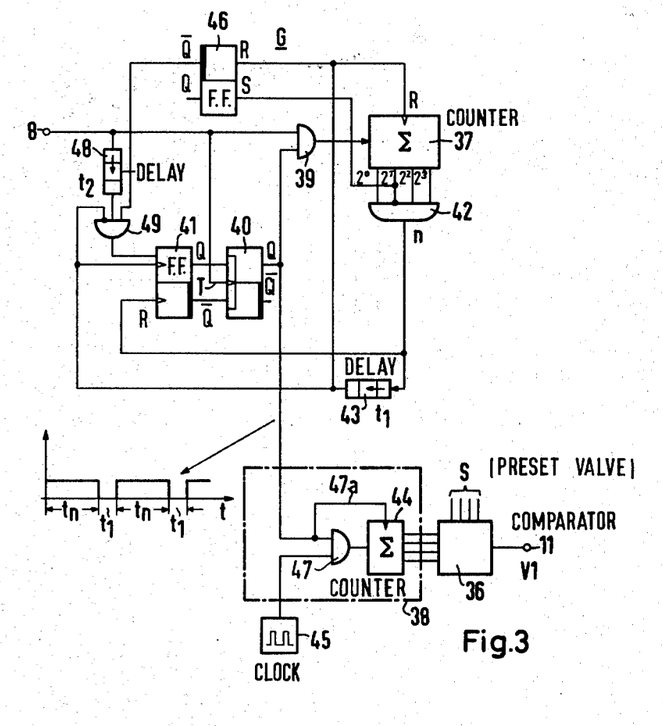
FIG. 3 is a logic diagram illustrating the operation of the frequency comparision means of FIG. 1.

FIG. 3 illustrates an embodiment of the frequency comparator G1 of FIG. 1. The frequency comparators G2 and G3 will of course, be identical. It should also be noted that other types of frequency comparators may equally as well be used. The circuit of FIG. 3 can best be understood by tracing its operation in response to pulses at the input terminals 8. At initial turn-on, each of the three flip-flops in the circuit designated 40, 41 and 46 along with the two counters 37 and 44 will be reset. In this state each of the flip-flops will have a 1 on its $\overline{Q}$ output and a 0 on its Q output. Thus, flip-flop 46 will have a $\overline{Q}$ output of 1 which enables gate 49. With a 0 count in the counter 37, its outputs will all be at 0. These are inputs to AND gate 42 which will also have a 0 output. This output through a delay 43 is a second input to gate 49. This input at 0 will be inverted so as to act as a 1 at the input of AND gate 49. Thus, two inputs are present enabling the gate to be responsive to an output from delay 48. The occurrence of a pulse at input terminal 8 going from 0 to 1 will cause the output of AND gate 49 to similarly go from 0 to 1, after a short delay through delay 48. This pulse will then set the flip-flop 41 causing its Q output to go to a 1 and its $\overline{Q}$ output to a 0. The pulse on line 8 will also be provided to the flip-flop 40 which is the type of flip-flop which in response to a pulse on its input indicated as T will be set or reset to whatever state is indicated by the output of the previous flip-flop. That is, if a 1 is present on the Q output of flip-flop 41 and a pulse occurs on the T input of flip-flop 40 its Q output will go to a 1. Similarly, if a 1 is present on the $\overline{Q}$ output of flip-flop 41 and a pulse occurs at the input T of the flip-flop will be reset and Q will go to zero and $\overline{Q}$ to a 1. The delay in delay means 48, which can comprise a conventional delay line or multi-vibrator delay, is made sufficiently long enough so that the Q output of flip-flop 41 does not occur until after the rising edge of the pulses on line 8. However, on the occurrence of the leading edge of the next pulse on line 8, flip-flop 40 will be set and have a 1 on its Q output. This will enable AND gate 39 to permit the pulse to be provided into the counter 37. Counter 37 will be a binary counter made of a plurality of flip-flops in conventional fashion. The outputs of the binary stages of the flip-flops are indicated in conventional fashion. Thus, this pulse, which is the second pulse occurring after the complete system is reset, will cause the $2°$ output to become a 1. Gate 39 continues to be enabled by the Q output of flip-flop 40 and thus, pulses will continue to be counted by the counter 37. After the second pulse the $2^1$ output will become a 1. This output is provided as a set input to flip-flop 46 and will cause its $\bar{Q}$ output to go to 0 and its Q output to a 1. The $\bar{Q}$ output is one input to gate 49 and when it goes to 0 will disable that gate. This will not however, have any effect on flip-flop 41 which will remain set having 2 Q output of 1 and thus flip-flop 40 will also remain set. Counter 37 will continue pulse until 13 pulses are counted. At this point $2^0$, $2^2$ and $2^3$ outputs will be 1 and the $2^1$ output 0. These are respective inputs to the AND gate 42 with the $2^1$ input being an inverted input thus AND gate 42 will effectively have all 1s at its input and will provide a 1 at its output. This output is a reset input to flip-flop 41 and will cause its Q output to become 0 and its $\bar{Q}$ output to become 1. At this point, 14 pulses have occurred from the beginning of the operation of this circuit when the first one not being counted because of the delay mentioned above and the next 13 being counted as described. On the next pulse, i.e. the 15th pulse flip-flop 40 will be reset since the $\bar{Q}$ output of flip-flop 41 is now a 1. The time that flip-flop 40 was set and had a Q output will be equal to 13 complete pulses in this particular instance. It should be noted, however, that the counter 37 can be adapted count up to any predetermined number N. The output of gate 42 is also delayed for a period indicated as T1 after which it sets flip-flop 41 again so that the cycle may be repeated. The output of delay 43 similarly resets the flip-flop 46 and the counter 37. This cycle will continually repeat with a plurality of pulses being provided out of the Q output of flip-flop 40 as shown by the timing diagram on the drawing. Each pulse will have a width of N input pulses where N is the modulo of counter 37. These pulses from flip-flop 40 are enabling inputs to an AND gate 47 which has as its second input a high frequency clock 45. The length of time that the gate 47 is enabled and designated $t_n$ on the drawing will be proportional to the speed of rotation of the turbine. That is, the faster the turbine is going the more closely the pulses out of the pulse transmitter T1 to T3 will be spaced and thus the sooner the counter 37 will count up to N. Thus, the time $t_n$ is inversally proportional to the speed of rotation. The faster the speed of rotation the shorter the time $t_n$. Gate 47 when enabled by the output of flip-flop 40 allows the clock pulses, which will be at a much higher frequency than the pulses at terminal 8, to be gated into a counter 44. Counter 44 is reset by the trailing edge of the pulse output from flip-flop 40 each time that pule occurs. (The falling edge of the output on line 47a in addition to resetting counter 44 gates its previous output to the comparator 36 in well known fashion.) Thus, at the beginning of the period $t_n$, the counter 44 is reset and will count as many pulses as occur during the time $t_n$. This number of pulses will be larger or smaller depending on the pulse $tn$. Counter 44 will be a binary counter such as counter 37 and although shown as only having four stages may have a larger number thereof. Also, all outputs need not necessarily be used, i.e. in some cases only the more significant bits need be provided as outputs. These outputs are provided as inputs to a comparator 36 which has a second plurality of inputs designated S representing a preset value. As long as the output of counter 44 is larger than the preset value, comparator 36 will output a 0. However, if the output of counter 44 becomes smaller than the pre-set value, comparator 36 will output a 1.

Figure 4:
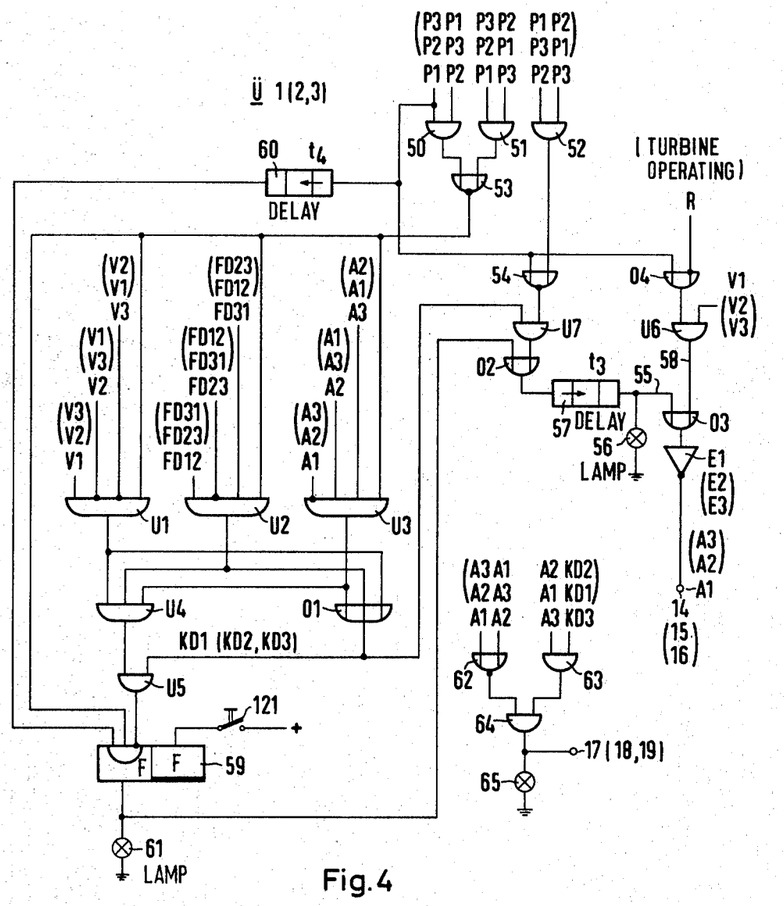
FIG. 4 is a logic diagram of one of the three channels illustrated on FIG. 1.

FIG. 4 illustrates the logic contained within the blocks Ü1, Ü2 and Ü3 of FIG. 1. The logic in each block is identical and therefore only that of block Ü1 has been shown. However, there has been indicated in brackets at each of the various inputs the corresponding inputs to blocks Ü2 and Ü3 respectively. It should be noted that the outset that most of the logic shown on FIG. 4 is used for self-test and malfunction detection purpose. The portion of the logic which responds to an overspeed output from a comparator is shown at the right hand of FIG. 4. An OR gate 04 has as one input the output P1 from the switch T1 shown on FIG. 1 and as an inverted input a signal designated R. R is a signal developed at the turbine indicating that the turbine control valve is open and a predetermined pressure is present within the turbine blades. This input R will be a 0 as long as these conditions are met and will become a 1 only if the valve is not open i.e. valve 3 of FIG. 1, and sufficient pressure is not present within the turbine. Thus, assuming an operating turbine the input R will be a 0 which when inverted will be a 1 causing gate 04 to have a 1 output. This 1 output is an enabling input to AND gate U6 so that if a second input V1 from its respective comparator G1 of FIG. 1 also becomes 1 as described above, gate U6 will have a 1 output. This 1 output will then appear at the output of OR gate 03 as the input to an output relay driver E1. This output driver is essentially an inverting amplifier and may comprise a transistor amplifier such as are commonly used for relay drivers. Thus, a 1 at the output of the driver E1 will cause an output A1 therefrom at terminal 14 which is a 0. As noted above, the relays driven by these outputs maintain their respective valves closed as long as they are energized and the valve is only open when both relay inputs go to 0. Thus, as long as V1 remains at 0, the output of U6 and 03 will also be 0 and the output of E1 a 1 preventing the turbine from tripping. However, when V1 becomes a 1 the output of E1 goes to 0. If this is a true overspeed condition, the same thing will happen in all three channels and the outputs A1, A2 and A3 will all go to 0 releasing all three relays and causing the hydraulic pressure to sharply drop at the valve 4 of FIG. 1 shutting the valve and stopping the turbine.

The next function of this logic circuit of FIG. 4 is the detection of malfunction. During normal operation when no tests are being made, each of the switches T1, T2 and T3 will be open and the respective inputs P1, P2 and P3 will all be 0. These inputs are the inputs to AND gates 50, 51 and 52. Thus, with P1 through P3 all 0, these three AND gates 50, 51 and 52 will all have 0 outputs. The output of AND gate 50 and 51 are inputs to a NOR gate 53. With two 0 inputs NOR gate 53 will have a 1 output. A second NOR gate 54 has as inputs the output of gate 52 and the input P1. Since these are both 0, NOR gate 54 will also have a 1 output. The output of NOR gate 53 enables the three AND gates U1, U2 and U3. The output of NOR gate 54 enables the AND gate U7. Assume that a malfunction occurs at the transmitter I1 and that it is not outputting pulses as it should. As shown on FIG. 1, this output of I1 is provided through the switches US1 to the frequency detectors F1 and F3. These frequency detectors are arranged so that they will provide an output of 0 if the two frequency inputs are the same and an output of 1 if the two frequency inputs are different. During normal operation will all transmitters operating properly, the transmitters normally should be outputting the same frequencies and each of the blocks F1 through F3 outputting a 0. This frequency comparison may be done with a circuit similar to that illustrated in FIG. 3 with the input S being provided by a duplicate of the illustrated circuit instead of as a constant valve, i.e. two of each element other than the comparator shown on FIG. 3 would be provided with one circuit having an input from one transmitter and the other circuit from the other transmitter. The two counter outputs of counters equivalent to counter 44 would then be provided as inputs to a comparator such as comparator 36 which would provide an output of 0 if both were the same and an output of 1 if they were different.

With the assumption that the transmitter I1 is not operating properly, the frequency detectors F1 and F3 would have two different input frequencies on their two inputs and each would thus output a 1. These respective outputs are designated FD12 and FD31 and are provided as inputs to gate U2 of FIG. 4. The fourth input to this gate, which is an inverted input, is the output FD23 of the freuency detector F2. Since the pulse train fml from transmitter I1 is not an input to this frequency detector and it is assumed that the other two transmitters I2 and I3 are operating properly, detector F2 will have an output FD23 which is a 0. However, this input is inverted and will act as a 1 at the input to gate U2. Thus, all four inputs are now present as 1 s at gate U2 and its output will go to a 1. This 1 will be transmitted through OR gate 01 to AND gate U7, which as noted above is also enabled. Thus, its output will also be a 1 and will cause OR gate 02 to have a 1 output. This output after a delay through delay line 57 will appear on line 55 at the input to OR gate 03 causing its output to go to a 1 and the output of the relay driver E1 to go to a 0. The output at the delay 57 will also light a lamp 56 to provide operating personal with an indication that a malfunction has occurred.

The output A1 which is now at 0 is fed back as one input to AND gate U3. since this input is inverted it will appear at that gate as a 1. The other channels are assumed to be operating properly and will have 1 at their respective A2 and A3 outputs which are the other two inputs to gate U3. The fourth input as noted above is obtained from NOR gate 53 and is still a 1. Thus, gate U3 will effectively have all 1s at its input and will provide a 1 output which will be transmitted through gate 01, gate U7, gate 02 and delay 57 to line 55 and thence through gate 03 to maintain the output both at the lamp 56 and the output of driver E1 at 0. Thus, even if the failure of the transmitter I1 is intermittent, the system, because of the feed back of A1, will latch up and maintain the lamp 56 on and the output A1 at 0 until corrective action is taken.

Assume that a malfunction occurs in G1. That is to say, the output V1 becomes a 1 other than during an overspeed condition. V1 is one input to AND gate U1 which as noted above is enabled from NOR gate 53. The other two inputs are V2 and V3, both of which should be 0 under normal operation. These are both inverted inputs and thus, if V1 becomes a 1, all 1s will be present at the input of gate U1 causing it to have a 1 output. In a fashion similar to that described above, this will result in an output at gate 01 which will ultimately cause the output state E1 to go from a 1 to a 0 and the lamp 56 to light up in a latched condition. Thus, any malfunctions at the input portion will readily be detected and indicated by lamp 56. In addition, these malfunctions will result in an output which places the system in a condition where only one of the two remaining channels need detect an overspeed for the turbine to shut down. Thus, a malfunction in one channel, rather than resulting in loss of protection works in the opposite fashion in that only one more malfunction or actual overspeed will cause a trip of the generator. At the same time, a single malfunction will not cause a turbine shutdown.

The delay device 57 helps to avoid faulty operation which might occur due to the condition wherein an overspeed indication did not occur simultaneously at the outputs of the frequency comparators G1, G2 and G3 in the individual channels, due to the mechanical arrangement of the pulse transmitters I1, I2 and I3. Thus, it is possible, for example, in a case of actual excess speed for output signal V1 of the frequency comparator G1 to have a 1 output with the output signals of the other two comparators G2 and G3 remaining at 0 for a brief subsequent time. In this case, AND gate U1 provides a 1 output signal, which without the delay device 57, could cause the output driver E1 to go to 0 as described above. Switching off in the case of an actual overspeed, however, should take place exclusively via the line 58. This type of operation is insured by the delay caused by the delay member 57 which preferably is a delay of time approximately equal to the time of a measurement cycle.

What has been described to this point will of course only check the inputs and will not check the proper functioning of the circuit of FIG. 4 itself nor the output circuits to the relays. In order to completely check the system, the switches T1 which permit self test of a single channel or groups of channels, are provided as explained above.

Consider first a single channel test. In testing channel I, switch T1 will be closed resulting in a 1 output on line P1. With a 1 only on P1, the AND gates 50 and 51 will continue to have 0 outputs and NOR gate 53 will continue to have a 1 output to enable the gates U1, U2 and U3. The line P1 is, however, the second input to NOR gate 54 and now that it has gone to a 1 the output of that gate will go to 0 disabling gate U7. With switch T1 depressed, the switch US 1 of FIG. 1 will now be coupling the output of pulse generator 7 to the input 8 of the frequency comparator and to the frequency detectors F1 and F3. Since this frequency is selected higher than any expected machine output frequency, the frequency comparator G1 will have a V1 output which is 1 as will the frequency detectors F1 and F3. That is, the outputs V1, FD12 and FD31 will all be 1. As explained above, this will cause gate U2 to have all 1s at its inputs and will also cause gate U1 to have all 1s at its inputs. Either one of these conditions, resulting in a 1 output at that respective gate, will cause gate 01 to have an output of 1. In addition, the input P1 which is at a 1 is provided to OR gate 04 causing it to have a 1 output.

Note that this permits testing even in the absence of the signal R. With V1 also a 1, gate U6 will have a 1 output as will OR gate 03 causing the output relay driver E1 to go to 0 as noted above. This is fed back to gate U3. In the manner described above, gate U3 will then also have a 1 output. Thus, all three gates now have outputs of 1. These are provided as inputs to an AND gate U4 which, if everything is working properly, will now have a 1 output. The output of gate U4 is Anded with the output of gate 01 in an AND gate U5. This assures that gate 01 is operating properly. Thus, gate U5 will have a 1 output only if all the previous mentioned gates are operating in a proper manner. The output of gate U5 is provided as 1 input to a gated flip-flop 59. Flip-flop 59 will normally be reset and will only be set if all of its inputs at its input gate are 1. One of these inputs is from NOR gate 53, which under the test conditions as described above will have a 1 output. The second input is the P1 input which is passed through a delay 60 having a delay time $t_4$ essentially equal to the settling time of the gating arrangement. Thus, after sufficient time for all gates to settle out, both the P1 input and the output of NOR gate 53 will be present at the input gate of flip-flop 59. If all circuits are operating properly, the output of gate U5 will at this point be a 1. Since this is an inverted input to the flip-flop gate the flip-flop will not be set. However, if a malfunction exists within the logic circuits the output of gate U5 will be a 0 and flip-flop will have all 1 at its input gate and will be set. Once set it will light lamp 61 and provide an output to OR gate 02 which after passing through the delay 57 and OR gate 03 will maintain a 1 at the input of output stage E1 to maintain the output A1 at 0 until flip-flop 59 is reset via switch 121.

Note that during a normal test, depression of T1 will result in the above described series of events but that the only quantity holding the output A1 at 0 is the input V1. This is because the AND gate U7 is disabled and the latching feed-back from gate 01 is no longer present. Thus, if all is normal the reopening of switch T1 will cause the system to go back to normal. However, if a malfunction exists the output of flip-flop 59 into the OR gate 02 will assure that the output of E1 remains in the 0 state until corrective action has been taken.

The various tests described above assure that all system components are operating properly up to the input to the relays. The possibility exists however that the relays themselves may have malfunctions or may not operate properly. For example, a relay might be mechanically hung up and would not open its respective valve when released. Similar problems could be caused by mechanical binding within the valves themselves. Thus, it is also necessary to have the capability to perform a complete test referred to as a test in earnest. As noted above, prior to performing this test the valve 30 of FIG. 1 is switched over to cause the pressure H02 to maintain the valve 4 closed. Other means, either another system such as the one described herein or a mechanical hydraulic backup system, may be used to protect the turbines during the testing interval. With the turbine no longer dependent on H01 and with the switch 34 closed to permit activation of two outputs such as P1 and P2, the test in earnest can now be conducted. Assume that these two channels i.e. channels I and II are the ones being tested. From the explanation below of the operation for these channels, it will be readily be seen how any other pair of channels can be tested in the same manner. With the switches T1 and T2 closed, the outputs P1 and P2 will both be 1. This will result, at channel I, in the AND gate 50 having 1 output and NOR gate 53 having a 0 output. A similar occurrance will be found in channel II wherein the inputs P2 and P1 to gate 51 will cause it to have a 1 output causing its NOR gate 53 to have a 0 output. Gate 50 and 51 in channel III will each only have one 1 input and their outputs remain at 0. NOR gate 53 in channel III will, thus, continue to have a 1 output. Gate 52 in channel I which has as inputs P2 and P3 one of which is 1 and one of which is 0 will continue to have a 0 output. Similarly, gate 52 in channel II which has P3 and P1 as inputs will continue to have a 0 output. However, gate 52 in channel III which has P1 and P2 as inputs will have an output that goes to 1. In channel I, NOR gate 54 will have a 1 input from the P1 input and will thus have a 0 output. In channel II, gate 54 will have a 1 input from the P2 input and will similarly have a 0 output. In channel III gate 54 will have a 1 output from gate 52 and, thus, it will also have a 0 output. Thus, in all three channels the gates U7 will be disabled by the outputs of NOR gates 54, in channels I and II the gates U1, U2 and U3 will be disabled, and in channel III the gates U1, U2 and U3 will be enabled.

The outputs of the frequency comparators G1 and G2, V1 and V2 respectively, will both be 1 since the output of frequency generators 7 is now being input thereto. The output of the frequency comparator G3 will remain at 0. The frequency detector F1 will have as inputs the two pulse generaor outputs which are selected to be at the same frequency and thus will have an output FD12 of 0. The frequency detectors F2 and F3 will have different frequency inputs and thus, the outputs FD23 and FD31 will be 1s. Thus, the gate U2 of channel 3 which has as inputs FD31, FD23, both of which as noted above are 1 and as an inverted input FD12 which as noted above is a 0 and in addition is enabled by its NOR gate 53 will effectively have all 1s at its input and will provide a 1 at its output. Assuming all circuits are functioning properly this 1 will appear at the output of OR gate 01 as a signal designated KD31, remembering that it is the third channel we are referring to. In each of channels I and II, the gates U6 will be enabled from an output or OR gate 04 and, since the respective quantities V1 and V2 are 1, the output of gates U6 will be 1 resulting in a 1 output from gate 03 and an output from E1 and E2 which are 0 i.e. the outputs A1 and A2 will both be 0. Since channel III is still operating normally, other than the output of gate U2 and gate 01, which output will not affect its output driver E3 because of the disabling of gate U7, it will continue to have an output A3 which is 1. The inputs A1 and A2 both of which are 0 as noted above are the inputs to an NOR gate 62 in an evaluator circuit in channel I. With both these inputs 0 gate 62 will have an output which is 1. An AND 63 has as inputs A3 and KD3 both of which should be 1 as described above. Thus, it too should have a 1 output. These two 1s are combined in AND gate 64 which then will also have a 1 at its output which is used to light a lamp 65 indicating a successful test. Also shown is an output terminal 17 which may be used for evaluation or transmittal of results to a remote location. In addition, during this test the manometer 28 of FIG. 1 may be observed to ensure that a pressure drop occurs in response to the signal. This will occur if relay 20 operates properly in response to the signal. This will occur if relay 20 operates properly in response to the outputs A1 and A2 both going to 0. Thus, both the electronic and electro-mechanical portions of the system can be effectively tested.

In similar fashion, tests may be run operating switches T2 and T3 to check out relay 21 and its associated valve 24 and switches T1 and T3 to check out relay 22 and its associated valve 25. In this manner, through the built-in malfunction detection, single channel tests and dual channel tests the complete system can be effectively checked out. Preferably a fourth channel may be provided which may be used as a substitute for one of the other three channels should a malfunction be detected therein. This permits full system operation during repair.

Figure 5:
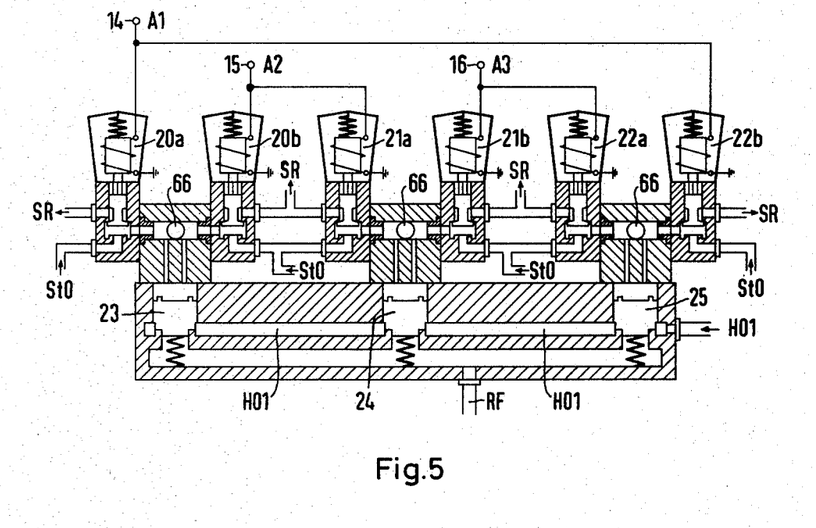
FIG. 5 is a diagram illustrating the hydraulic valve arrangement of the present invention.

FIG. 5 illustrates the electrical and hydraulic arrangement of the relays and valves of FIG. 1. The control oil pressure is provided at an input labelled H01, which corresponds to the junction of the three pipes of FIG. 1, to each of the three valves 23, 24 and 25. As shown, each of the valves is spring biased in an upward direction and held down by a control medium having a pressure ST0. As shown, each of the valves is in a closed position with the pressure ST0 holding the valve against its seat so that the pressure H01 cannot be reduced by hydraulic flow through the valves to the space therebelow and out through the return pipe labelled RF. Each of the relays 20, 21 and 22 is comprised of two relay coils designated respectively as 20a and 20b, 21a and 21b and 22a and 22b. As shown, the inputs to relays 20a and 22b are coupled to terminal 14 at which is found the output A1, relays 20b and 21a to terminal 15 at which is found the output A2 and relays 21b and 22a to terminal 16 to which is found the output A3. As shown, all of the relays are energized keeping their valves open so that a control oil pressure ST0 is being provided through a check-valve 66 and into the cylinder above the valves 23, 24 and 25 to maintain them in a closed position.

If the relay 20a, for example, becomes deenergized, the control oil flows through the valve and out the return SR without exerting any pressure on the valve 23. However, control pressure is still being provided through the valve 20b. This continues to maintain the valve 23 closed. The check valve 66 prevents the pressure obtained through the control valve 20b from being relieved by a path through the valve associated with valve 20a. However, should the relay 20b also be deenergized, the pressure on the valve 23 is released and the spring force will cause it to open allowing the control pressure H01 to be reduced by flow through the return RF. As described above, this results in a pressure drop at the valve 4 of FIG. 1 causing that valve to close shutting down the turbine. The operation at this valve is accomplished in conventional fashion using mechanical amplifiers and storage devices.

Thus, an improved system for monitoring and limiting the speed of a turbine, which system has self test and malfunction detection capabilities and provides for operation under various conditions has been shown. Although specific embodiments have been illustrated and described, it will be obvious those skilled in the art that various modifications may be made without departing from the spirit of the invention which is intended to be limited solely by the appended claims.

What is claimed is:

1. Apparatus for monitoring and limiting the speed of a turbine comprising:
   a. means coupled to the turbine shaft to output a plurality of pulse trains each having a frequency which is equal to the others and proportional to the turbine speed;
   b. an equal plurality of monitoring channels each channel comprising:
      1. means having a respective one of said pulse trains as in input and providing a first output if the frequency of the pulse train exceeds a predetermined value;
      2. means having two of said pulse trains as inputs, one of which is the same pulse train provided to said means having a respective pulse train as an input, with a different pair coupled to each channel, and providing a second output if said two pulse trains have different frequencies; and
      3. means having said first and second outputs as inputs and providing a final output in response to either of said first and second outputs; and
   c. means responsive to the final outputs of said plurality of channels to shut down the turbine.

2. The invention according to claim 1 wherein said means coupled to the turbine shaft comprise;
   a. a pulse disk coupled to said shaft; and
   b. a plurality of stationary pulse transmitters adjacent thereto adapted to provide output pulse train in response to rotation of said disk.

3. The invention according to claim 2 wherein said plurality is equal to three and said means responsive to said final outputs is responsive to shut down said turbine only if final outputs are present from at least two of said three channels.

4. The invention according to claim 3 wherein said means responsive to shut down said turbine comprises a fast action shut-off valve placed in the input line to the turbine and a plurality of electro-hydraulic means coupled to pairs of said final outputs for operating said valve, said final outputs being such as to remove an energizing voltage from said electro-hydraulic means when present, the removal of energization by both of said pair being necessary to shut down said turbine.

5. The invention according to claim 4 and further including means for testing said monitoring channels.

6. The invention according to claim 5 wherein said testing means comprise:
   a. means for generating a test frequency;
   b. means for selectively switching the input to each of said channels to either said means for generating a test frequency or a respective pulse train; and
   c. means for evaluating the proper response of said channels to said test frequency.

7. The invention according to claim 6 wherein a separate test frequency generator is provided for each channel and said means for selectively switching comprise three individual switches having inputs coupled to said test frequency generators and respective pulse trains and further including means to interlock said switches so that only one at a time may provide its test frequency to its respective monitoring channel.

8. The invention according to claim 7 and further including means for overriding said interlocks.

9. The invention according to claim 8 wherein said fast acting valve is maintained in an open position in response to a hydraulic pressure which is maintained as long as none of said electro hydraulic means are completely de-energized and further including a second hydraulic pressure source and means to switch from said first to said second hydraulic source, said means for overriding said interlock being operable in response to quick action shutoff valve being coupled to said second hydraulic source.

10. The invention according to claim 1 wherein each of said frequency comparators comprises:
   a. means to develop a pulse of a duration which is inversely proportional to the frequency of the input pulse trains;
   b. means for generating a pulse train at a frequency much higher than that of the input pulse train;
   c. means responsive to said pulse length to count the number of pulses from said high frequency generating means occuring during pulse length; and
   d. means to compare the number of pulses counted with a predetermined number and to provide said first output when said counted number is less than said predetermined number.

11. The invention according to claim 6 wherein said means having said first and second outputs as inputs comprises:
   a. gating means having said first and second outputs as inputs; and
   b. output driver means having the output of said gating means as an input and providing said final output as its output.

12. The invention according to claim 11 wherein said means having one pulse train as an input comprise frequency comparators said means having two pulse trains as inputs comprise frequency detectors and said means for evaluating proper response comprise:
   a. means responsive to outputs from all of said frequency comparators to provide a third output in response to said test frequency;
   b. means responsive to outputs from all of said frequency detectors to provide a fourth output in response to said test frequency; and
   c. means responsive to said third and fourth outputs to store an indication of a malfunction if said outputs are not present a predetermined time after switching said channel inputs to said test frequency, said stored indication being a further input to said gating means.

13. The invention according to claim 12 wherein each of said second output and said stored indication are coupled to said gating means through a delay.

14. The invention according to claim 13 wherein said means for testing further include means for performing a dual channel test with said test frequency being supplied to two channels, said means comprising:
   a. a first gate having the final outputs of two channels to which said test frequency is supplied as inputs and providing a fifth output when both inputs are present;
   b. a second gate having as inputs the final and second outputs of the remaining channel and responsive to the presence of said second output and absence of said final output to provide a sixth output;
   c. means to uncouple the second output of said remaining channel from its gating means; and
   d. a third gate having said fifth and sixth outputs as inputs and providing a seventh output in response to said fifth and sixth outputs being present.

15. The invention according to claim 4 wherein said said fast acting shut off valve is held in an open position by hydraulic pressure, with the line supplying said pressure coupled to three lines containing therein respectively first, second and third of said electro-hydraulic means each comprising;
   a. a spring loaded piston valve which when open couples its respective line to an hydraulic return line; and
   b. a pair of magnetically controlled valves, which when open supply a pressure to maintain said piston valve closed against its spring pressure, said valves being maintained open by the energization of their magnet coils by final outputs from two of said channels.

16. The invention according to claim 15 and further including a check valve decoupling each of said pair of magnetic valves whereby both valves must be deenergized to permit said piston valve to open.

* * * * *

UNITED STATES PATENT OFFICE
CERTIFICATE OF CORRECTION

Patent No. 3,859,007                          Dated January 7, 1975

Inventor(s) Hans-Jochen Kowalski et al.

It is certified that error appears in the above-identified patent and that said Letters Patent are hereby corrected as shown below:

In column 1, line 42, change "whille" to --while--

In column 1, line 60, change "timer" to --time--
In column 4, line 46, change "maintian" to --maintain--
In column 7, line 16, change "2 Q output" to --a Q output--
In column 7, line 17, change "continue pulse" to --continue counting pulses--
In column 7, line 26, change "when" to --with--
In column 7, line 58, change "pule" to --pulse--
In column 8, line 16, change "noted that" to --noted at--
In column 9, line 9, change "will all" to --with all--
In column 9, line 31, change "freuency" to --frequency--
In column 10, line 30, change "0for" to -- 0 for --
In column 11, line 29, change "flipflop will" to --flipflop 59 will--
In column 12, line 31, change "generaor" to --generator--
In column 12, line 45, change "or" to --of--
In column 13, line 63, change "obvious those" to --obvious to those--
In column 13, line 49, change "valve 20a" to --relay 20a--

Signed and Sealed this eighteenth Day of November 1975

[SEAL]

Attest:

RUTH C. MASON  
Attesting Officer

C. MARSHALL DANN  
Commissioner of Patents and Trademarks